(12) United States Patent
Lucachick et al.

(10) Patent No.: US 12,736,424 B2
(45) Date of Patent: Sep. 15, 2026

(54) MODULAR SPINDLE FORCE SENSOR

(71) Applicant: ILLINOIS TOOL WORKS INC., Glenview, IL (US)

(72) Inventors: Glenn Arthur Lucachick, Bloomington, MN (US); Robbin Scott Roberts, Saint Michael, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 374 days.

(21) Appl. No.: 18/483,275

(22) Filed: Oct. 9, 2023

(65) Prior Publication Data

US 2024/0125664 A1 Apr. 18, 2024

Related U.S. Application Data

(60) Provisional application No. 63/416,228, filed on Oct. 14, 2022.

(51) Int. Cl.
*G01L 5/20* (2006.01)

(52) U.S. Cl.
CPC .................................... *G01L 5/20* (2013.01)

(58) Field of Classification Search
CPC ............. G01L 5/20; G01L 5/16; G01M 17/04
See application file for complete search history.

(56) References Cited

U.S. PATENT DOCUMENTS 3,377,849 A 4/1968 Lebow
3,618,376 A 11/1971 Shull et al.
3,693,425 A 9/1972 Starita et al.
3,771,359 A 11/1973 Shoberg
3,780,573 A 12/1973 Reus
3,867,838 A 2/1975 Gerresheim
4,297,877 A 11/1981 Stahl
4,448,083 A 5/1984 Hayashi
4,483,203 A 11/1984 Capper
4,488,441 A 12/1984 Ramming
4,493,220 A 1/1985 Carignan et al.
4,499,759 A 2/1985 Hull
4,550,617 A 11/1985 Fraignier et al.
4,573,362 A 3/1986 Amlani
4,640,138 A 2/1987 Meyer
4,672,855 A 6/1987 Schmieder
4,748,844 A 6/1988 Yoshikawa et al.
4,763,531 A 8/1988 Dietrich et al.
4,821,582 A 4/1989 Meyer et al.
4,823,618 A 4/1989 Ramming
(Continued)

FOREIGN PATENT DOCUMENTS

DE 2302540 A1 7/1974
GB 2096777 A 10/1982
WO WO-2021160629 A1 * 8/2021 ............ G01M 17/02

*Primary Examiner* — Timothy P Graves
(74) *Attorney, Agent, or Firm* — Steven M. Koehler; Westman, Champlin & Koehler, P.A.

(57) ABSTRACT

A wheel support includes a support member configured to be secured to a suspension component of a vehicle. The wheel support includes a transducer body having a rigid annular rim secured to the support member; a rigid center support; and a plurality of radial members extending radially and joining the central support to the annular rim, each of the radial members including at least one portion configured to respond to loads transferred between the center support and the annular rim.

18 Claims, 4 Drawing Sheets

(56) References Cited

U.S. PATENT DOCUMENTS

| | | | | |
|---|---|---|---|---|
| 5,313,828 | A | 5/1994 | Kotzle et al. | |
| 5,315,882 | A | 5/1994 | Meyer et al. | |
| 5,400,661 | A | 3/1995 | Cook et al. | |
| 5,540,108 | A | 7/1996 | Cook et al. | |
| 6,038,933 | A | 3/2000 | Meyer | |
| 2008/0211293 | A1* | 9/2008 | Ai | B60B 27/00 301/105.1 |

* cited by examiner 10
12
24
30
32
16
15
40
18
22
20
50
13
22
26
38
34
22
22
36

MODULAR SPINDLE FORCE SENSOR

CROSS-REFERENCE TO RELATED APPLICATION(S)

The present application is based on and claims the benefit of U.S. provisional patent application Ser. No. 63/416,228, filed Oct. 14, 2022, the content of which is hereby incorporated by reference in its entirety.

BACKGROUND

The discussion below is merely provided for general background information and is not intended to be used as an aid in determining the scope of the claimed subject matter.

Various forms of transducers have been advanced for measuring force and moment data acting through a wheel assembly mounted to a spindle, such as a vehicle spindle. The data collected is useful in the design and manufacture of vehicles and/or vehicle systems. Typically, the transducer is secured to or is otherwise formed with a wheel rim that in turn supports a tire mounted thereto. The rim having the transducers is mounted conventionally to the spindle. Data is collected as the wheel assembly and transducer rotates upon the spindle. In view that the transducer is rotating, sensor output signals need to be processed so that forces and moments relative to a non-rotating coordinate system are obtained. Although current load cells are effective tools, an improved apparatus method for measuring forces and moments generated by a rotating wheel assembly with respect to one or more degrees of freedom is needed.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in deter-mining the scope of the claimed subject matter. The claimed subject matter is not limited to implementations that solve any or all disadvantages noted in the Background.

One general aspect includes a wheel support for a vehicle wheel. The wheel support includes a support member configured to be secured to a suspension component of a vehicle. The support also includes a transducer body having a rigid annular rim secured to the support member; a rigid center support; and a plurality of radial members extending radially and joining the central support to the annular rim, each of the radial members including at least one portion configured to respond to loads transferred between the center support and the annular rim.

Implementations may include one or more of the following features. The annular rim, the center support and the plurality of radial members can be integral being formed from a single unitary body. In a preferred embodiment, the annular rim is removably secured to the support member; however, the support member can be integral with the annular rim, for example, with the center support and the plurality of radial members. The support member includes a ring portion having a ring axis. With the support member separate from the annular rim, the annular rim secured to the ring portion with a plurality of fasteners, the fasteners being spaced apart from each other about the ring axis. To provide a compact assembly, the ring portion can include an annular recess formed by an inwardly facing cylindrical surface, an outer annular surface and an inner annular surface. The outer annular surface faces in a direction along the ring axis and extends radially outwardly from the cylindrical surface along a first annular edge, while the inner annular surface faces in a direction along the ring axis and extends radially inwardly from the cylindrical surface along a second annular edge axially displaced from the first annular edge along the ring axis. In one embodiment to provide space for vehicle components proximate the wheel support, the cylindrical surface and the inner annular surface can extend about only a portion of the ring axis, while the outer cylindrical surface extends completely about the ring axis.

In one embodiment, particularly with the inner annular surface extending only about a portion of the ring axis, the wheel support can include at least one securing plate extending radially and joining the annular rim to the outer annular surface. The securing plate has at least a portion bridging between annular rim and the outer annular surface angularly spaced apart from ends of the first annular edge. The securing plate provides a rigid connection of the annular rim to the support member where the inner annular surface is not present about the ring axis. If desired a plurality of spaced apart securing plates can be provided depending on the annular gap missing between ends of the inner annular surface.

The wheel support can include a spindle assembly removably mounted to the center support. In one embodiment, the center support includes an aperture wherein the spindle assembly can have a portion extending into the aperture. The spindle assembly can comprises a spindle adapter removably mounted to the center support and a spindle mounted to the spindle adapter. The spindle adapter can include a mounting arrangement such as an annular rim having the same spaced apart apertures for fasteners to removably join the spindle adapter and other different spindle adapters to all be removably mounted to the center support. Likewise, the support member can be configured with specific mounting arrangements allowing it to be designed for a specific vehicle suspension, but the mounting arrangement of the annular rim to the support member can be standard. In this manner, the transducer body can be reused for testing different vehicle suspension/spindle arrangements, using different support members and/or spindle assemblies, thereby lowering costs.

DETAILED DESCRIPTION

Figure 1:
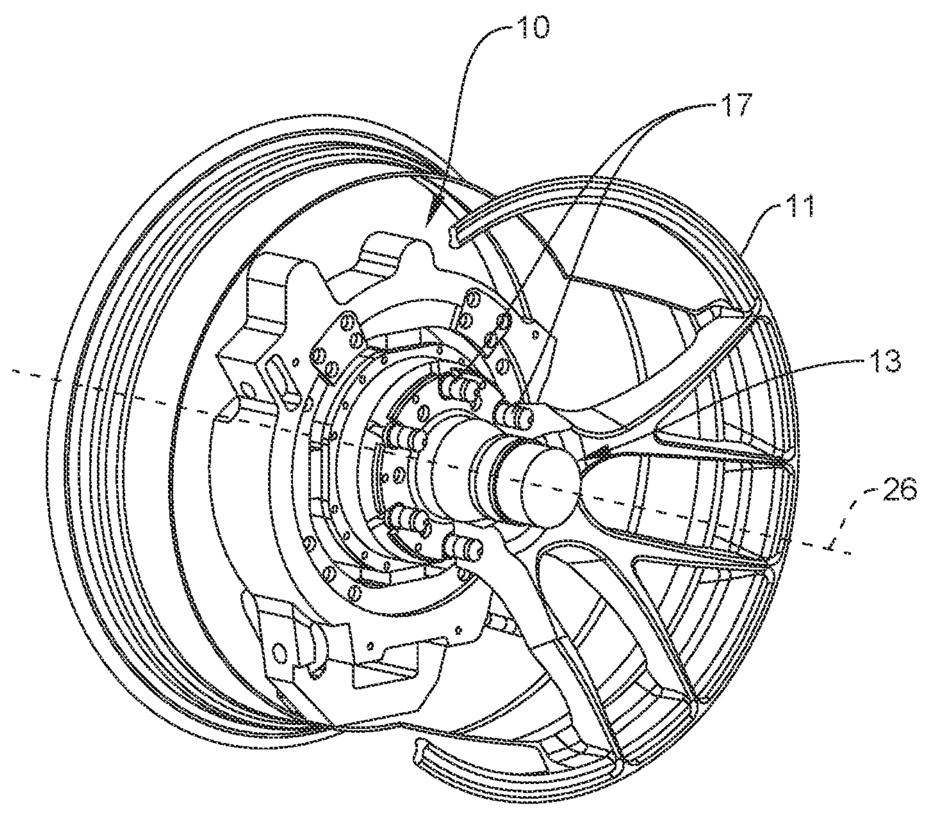
FIG. 1 is a front perspective view of a wheel mounted to a wheel support.
Figure 2:
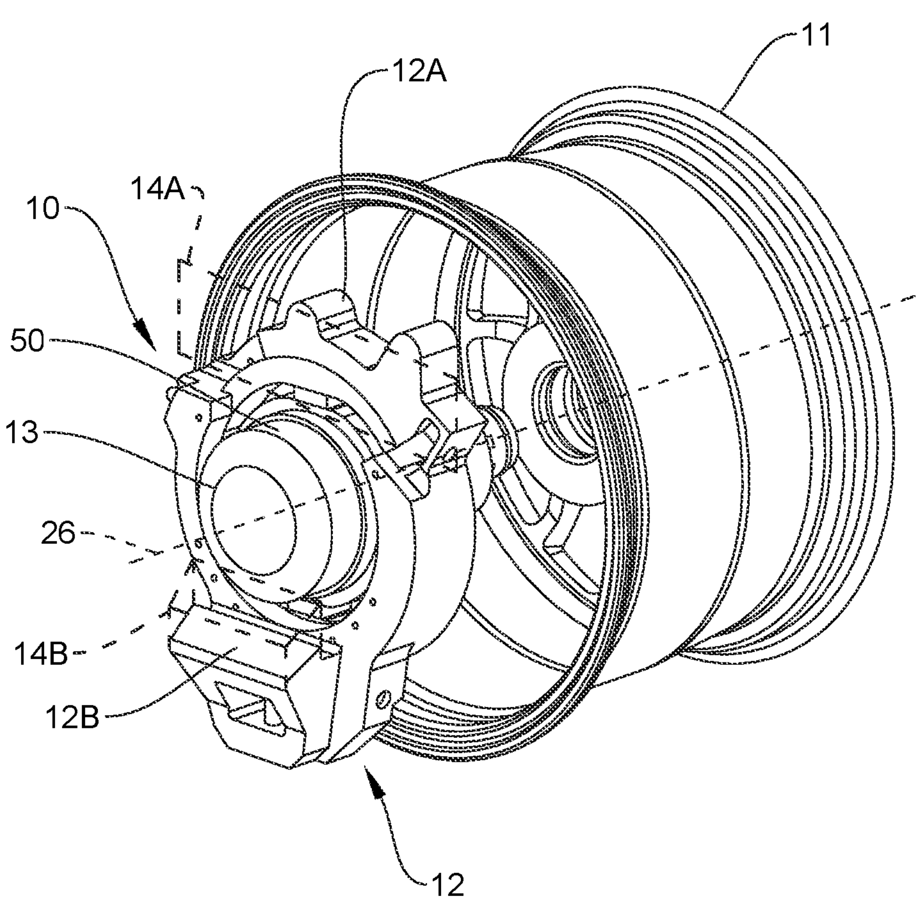
FIG. 2 is a rear perspective view of the wheel support and wheel.

A wheel support 10 for a vehicle wheel 11 is illustrated in FIGS. 1 and 2. Generally, the wheel support 10 supports a spindle 13 to which the vehicle wheel 11 is mounted thereto in a conventional manner using lug bolts and or nuts 17. Generally, the wheel support 10 is mounted or secured to suspension components of a vehicle indicated schematically by dashed blocks 14A and 14B (FIG. 2).

The wheel support 10 includes a support member 12 to which a transducer body 16 is mounted. The transducer body 16 supports a spindle assembly 15 having a spindle 13. The transducer body 16 measures various forces and torques from the vehicle spindle 13 to the suspension components 14A and 14B, and steering linkage if needed. The support member 12 is configured to be secured to the suspension components 14A and 14B at portions 12A, 12B, respectively, which again are schematically illustrated. It should be understood that the suspension components and/or steering linkage are not pertinent to the present invention and may be of different design from vehicle to vehicle.

The transducer body 16 includes a rigid annular rim 18 secured to the support member 12 and a rigid center support 20. A plurality of radial members 22 extend radially and join the rigid annular rim 18 to the rigid center support 20. Each of the radial members 22 include at least one portion configured to respond to the loads transferred between the rigid center support 20 and the annular rim 18. One suitable transducer body 16 that can be used is described in U.S. Pat. No. 6,038,933 issued Mar. 21, 2000, the contents of which are incorporated here and by reference in its entirety. In one embodiment, the annular rim 18, the center support 20, and the plurality of radial members 22 are integral formed from a single unitary body. Strain sensors not shown are mounted to the radial members 22 and are connected as described in U.S. Pat. No. 6,038,933 to provide an indication of strain in the radial members due to force loads transferred between the center support 20 and the annular rim 18. If desired, other sensors such as capacitive based sensors or optical based sensors can also be used. In a preferred embodiment, the annular rim 18 is removably secured to the support member 12.

The support member 12 comprises a ring portion 24 having a ring axis 26, preferably coinciding with a spindle axis of the spindle 13. The annular rim 18 is secured to the ring portion 24 with suitable fasteners (not shown) such as threaded fasteners for the apertures shown in the annular rim, the fasteners being spaced apart from each other about the ring axis 26.

The ring portion 24 includes an annular recess 30 formed by an inwardly facing cylindrical surface 32, an outer annular surface 34 and an inner annular surface 36. The outer annular surface 34 faces in a direction along the ring axis 26 and extends radially outwardly from the cylindrical surface 32 along a first annular edge 38. The inner annular surface 36 faces in a direction along the ring axis 26 and extends radially inwardly from the cylindrical surface 32 along a second annular edge 40 and is axially displaced from the first annular edge 38 along the ring axis 26. In one embodiment, the second annular edge 40 formed between a portion of the cylindrical surface 32 and the inner annular surface 36 extend about only a portion of the ring axis 26, while the outer annular surface 34 and first annular edge 38 extends completely about the ring axis 26. Fasteners 28 comprise a set of first fasteners that join the annular rim 18 to the inner annular surface 36.

In the embodiment illustrated, at least one securing plate 44, herein two spaced apart securing plates 44 are provided, extend radially and join the annular rim 18 to the annular outer surface 34. The securing plates 44 are located about a portion of the ring axis 26 that the inner annular surface 36 and second annular edge 40 does not encircle. Each securing plate 44 has at least a portion bridging between the annular rim 18 and the outer annular surface 34 and is angularly spaced apart from ends of the first annular edge 38. Together, the securing plates 44 and the inner annular surface 36 provide support for the annular rim 18 about the ring axis 26.

Figures 3, 4:
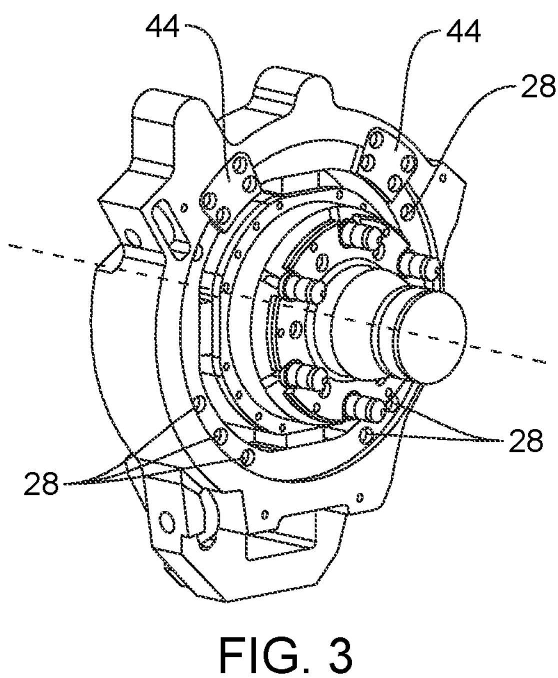
FIG. 3 is a front perspective view of the wheel support.
FIG. 4 is a front perspective exploded view of the wheel support illustrated in FIG. 3.
Figure 5:
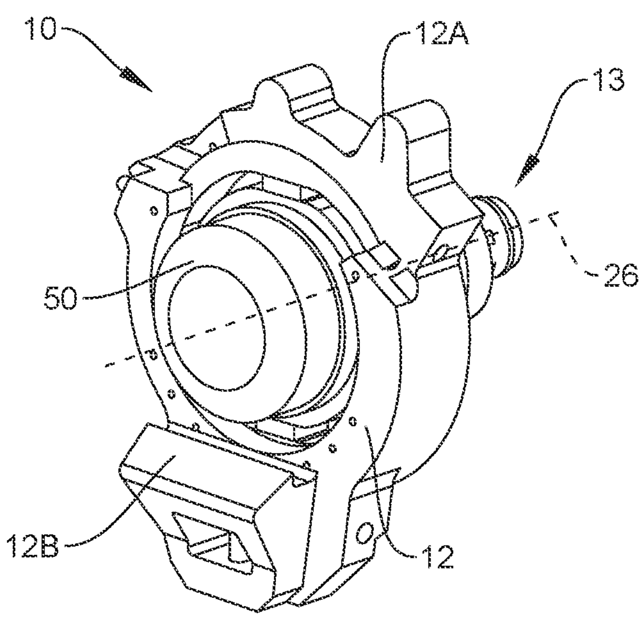
FIG. 5 is a rear perspective view of the wheel support.
Figure 6:
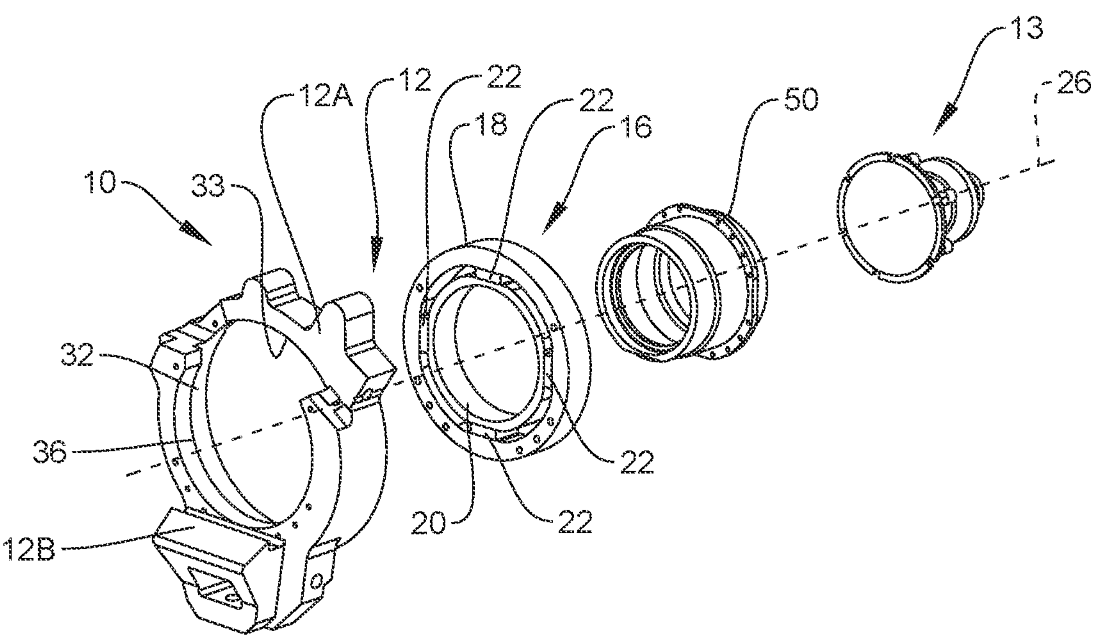
FIG. 6 is a rear perspective exploded view of the wheel support of FIG. 5.

Referring to FIGS. 4 and 6, the spindle assembly 15 is supported by the center support 20 and can take any number of forms depending upon the application. In the embodiment illustrated, the spindle assembly 15 includes a spindle adaptor 50 mounted to the center support 20 with suitable spaced apart fasteners not shown. The spindle adaptor 50 in turn supports the vehicle wheel spindle 13 to which the wheel 11 is mounted.

In another way of characterizing the present invention, the wheel support 10 includes the transducer body 16 and includes a first portion, herein center support 20, having the spindle 15, preferably removably mounted thereto and configured to support the wheel 11 for rotation about the axis 26 of the spindle 15. A second portion, herein the rigid annular rim 18, is configured to be removably secured to the support member 12, which in turn is mounted suspension components 14A and 14B of the vehicle, not otherwise shown. For instance, the second support member 18 includes the first portion 14A configured to be mounted to an upper vehicle suspension component via portion 12A, and a second portion configured to be mounted to a lower vehicle suspension component 14B via 12B. For example, the upper vehicle suspension component 14A and the lower vehicle suspension component 14B can comprise ball joints as by way of example and should not be considered limiting.

The transducer body 16 includes the plurality of transducer body elements 22 that connect the first support member 20 and the second support member 18, preferably at equal angular intervals about the ring axis 26. The second support member 18 is disposed about the first support member 20 opposite the spindle 15. In one embodiment, the transducer elements 22 comprise a first pair of transducer elements 22A extending in opposite directions connecting the first support member 20 to the second support member 18, while a second pair of transducer elements 22B extend in opposite directions and also connect the second support member 18 to the first support member 20. In one embodiment, each of the transducer elements can comprise a tubular structure having a center axis as described in U.S. Pat. No. 6,038,933, each of the center axes of each of the pairs of transducer elements 22A and 22B are configured so as to be parallel to each other.

The wheel support 10 can include the spindle assembly 15 removably mounted to the center support 20. In one embodiment, the center support 20 includes an aperture 51 wherein the spindle assembly 15 can have a portion extending into the aperture 51. The spindle assembly 15 can comprises the spindle adapter 50 removably mounted to the center support 20 and the spindle 13 mounted to the spindle adapter 50. The spindle adapter 50 can include a mounting arrangement such as an annular rim having spaced apart apertures for fasteners to removably join different spindle adapters 50 to the center support 20 using the apertures shown, which can be threaded. Likewise, the support member 12 can be configured with specific mounting arrangements allowing it to be designed for a specific vehicle suspension, but the removable mounting arrangement of the annular rim 18 to the support member 12 can be standard. In this manner, the transducer body 16 can be reused for testing different vehicle suspension/spindle arrangements, using different support members and/or spindle assemblies, thereby lowering costs. In addition, the removable transducer body 16 allows it to be calibrated on a system designed to calibrate such transducers. If the transducer body 16 was integral with the support member 12, calibration would be difficult and expensive since the support members 12 from application to application would have different designs.

Although the present invention has been described with reference to preferred embodiments, workers skilled in the art will recognize that changes may be made in form and detail without departing from the spirit and scope of the invention.

What is claimed is:

1. A wheel support for a vehicle wheel comprising:

a support member configured to be secured to a suspension component of a vehicle, wherein the support member comprises a ring portion having a ring axis; and a transducer body comprising:

a rigid annular rim removably secured to the support member;

a rigid center support; and a plurality of radial members extending radially and joining the center support to the annular rim, each of the radial members including at least one portion configured to respond to loads transferred between the center support and the angular rim, and wherein the annular rim, the center support and the plurality of radial members are integral being formed from a single unitary body, and wherein the annular rim is secured to the ring portion with a plurality of fasteners, the fasteners being spaced apart from each other about the ring axis.

2. The wheel support of claim 1 wherein the ring portion includes an annular recess formed by an inwardly facing cylindrical surface, an outer annular surface and an inner annular surface, the outer annular surface facing in a direction along the ring axis and extending radially outwardly from the cylindrical surface along a first annular edge, and the inner annular surface facing in a direction along the ring axis and extending radially inwardly from the cylindrical surface along a second annular edge axially displaced from the first annular edge along the ring axis.

3. The wheel support of claim 2 wherein the cylindrical surface and the inner annular surface extend about only a portion of the ring axis and wherein outer cylindrical surface extends completely about the ring axis.

4. The wheel support of claim 3 wherein the plurality of fasteners comprises a set of first fasteners joining the annular rim to the inner annular surface.

5. The wheel support of claim 4 and at least one securing plate extending radially and joining the annular rim to the outer annular surface, the at least one securing plate having at least a portion bridging between annular rim and the outer annular surface angularly spaced apart from ends of the first annular edge.

6. The wheel support of claim 5 and further comprising a spindle assembly removably mounted to the center support.

7. The wheel support of claim 6 wherein the center support includes an aperture, the spindle assembly having a portion extending into the aperture.

8. The wheel support of claim 7 wherein the spindle assembly comprises a spindle adapter removably mounted to the center support and a spindle mounted to the spindle adapter.

9. The wheel support of claim 8 wherein transducer elements joined to the transducer body and are spaced apart from each other and disposed about a spindle axis of the spindle.

10. The wheel support of claim 9 wherein the transducer elements are spaced apart from each other at equal angular intervals about the spindle axis of the spindle.

11. The wheel support of claim 7 wherein the spindle assembly comprises a spindle adapter removably mounted to the center support and a spindle mounted to the spindle adapter.

12. A wheel support for a vehicle wheel comprising:

a support member configured to be secured to a suspension component of a vehicle, wherein the support member comprises a ring portion having a ring axis; and a transducer body comprising:

a rigid annular rim removably secured to the support member;

a rigid center support; and a plurality of radial members extending radially and joining the center support to the annular rim, each of the radial members including at least one portion configured to respond to loads transferred between the center support and the annular rim, and wherein the annular rim, the center support and the plurality of radial members are integral being formed from a single unitary body, the annular rim being secured to the ring portion with a plurality of fasteners, the fasteners being spaced apart from each other about the ring axis; and a spindle assembly removably mounted to the center support, wherein the center support includes an aperture, the spindle assembly having a portion extending into the aperture.

13. A wheel support for a vehicle wheel comprising:

a support member configured to be secured to a suspension component of a vehicle; and a transducer body comprising:

a rigid annular rim removably secured to the support member;

a rigid center support; and a plurality of radial members extending radially and joining the center support to the annular rim, each of the radial members including at least one portion configured to respond to loads transferred between the center support and the annular rim, and wherein the annular rim, the center support and the plurality of radial members are integral being formed from a single unitary body, the annular rim being fixedly secured to the support member with a plurality of fasteners; and a spindle assembly removably mounted to the center support, wherein the center support includes an aperture, the spindle assembly having a portion extending into the aperture, and wherein the spindle assembly comprises:

a spindle adapter having an outer portion removably and fixedly mounted to the center support with fasteners; and a spindle mounted to the spindle adapter.

14. The wheel support of claim 13 wherein the annular rim is fixedly and removably secured to the support member with a second fasteners.

15. The wheel support of claim 14 wherein the ring portion includes an annular recess formed by an inwardly facing cylindrical surface, an outer annular surface and an inner annular surface, the outer annular surface facing in a direction along the ring axis and extending radially outwardly from the cylindrical surface along a first annular edge, and the inner annular surface facing in a direction along the ring axis and extending radially inwardly from the cylindrical surface along a second annular edge axially displaced from the first annular edge along the ring axis.

16. The wheel support of claim 15 wherein the cylindrical surface and the inner annular surface extend about only a portion of the ring axis and wherein outer cylindrical surface extends completely about the ring axis.

17. The wheel support of claim 16 wherein the plurality of fasteners comprises a set of first fasteners joining the annular rim to the inner annular surface.

18. The wheel support of claim 17 and at least one securing plate extending radially and joining the annular rim to the outer annular surface, the at least one securing plate having at least a portion bridging between annular rim and the outer annular surface angularly spaced apart from ends of the first annular edge.

* * * * *